United States Patent [19]

Earls

[11] Patent Number: 4,825,592
[45] Date of Patent: May 2, 1989

[54] VERTICAL PLANT SUPPORT HAVING TOP REEDER

[76] Inventor: Gilbert W. Earls, 1240 N. Ustler Rd., Apopka, Fla. 32712

[21] Appl. No.: 134,183

[22] Filed: Dec. 17, 1987

[51] Int. Cl.$^4$ .............................................. A01G 25/00
[52] U.S. Cl. ............................................. 47/82; 47/83
[58] Field of Search ................................ 47/62, 82, 83

[56] References Cited

U.S. PATENT DOCUMENTS

| | | | |
|---|---|---|---|
| 1,752,597 | 4/1930 | Jackson | 47/83 |
| 2,964,877 | 12/1960 | Gauding | |
| 3,142,935 | 8/1964 | Campos | |
| 3,188,771 | 6/1965 | Ballai | |
| 3,334,440 | 8/1967 | Choquette | |
| 3,672,571 | 6/1972 | Goodricke | |
| 3,685,204 | 8/1972 | O'Harra | 47/83 |
| 3,738,060 | 6/1973 | Jullien-Davin | |
| 4,065,876 | 1/1978 | Moffett, Jr. | 47/83 |
| 4,177,604 | 12/1979 | Friesen | 47/62 |
| 4,216,617 | 8/1980 | Schmidt | 47/62 |
| 4,218,415 | 8/1980 | Biscaro | |
| 4,361,982 | 12/1982 | Horowicz | |

FOREIGN PATENT DOCUMENTS

| | | | |
|---|---|---|---|
| 2646875 | 10/1978 | Fed. Rep. of Germany | 47/83 |
| 3144353 | 1/1983 | Fed. Rep. of Germany | 47/82 |
| 2314659 | 1/1977 | France | 47/59 |
| 2386250 | 12/1978 | France | 47/82 |
| 2026830 | 2/1980 | United Kingdom | 47/83 |
| 2055281 | 3/1981 | United Kingdom | 47/83 |

OTHER PUBLICATIONS

Joiner, Ed., Foliage Plant Production, Department of Ornamental Horticulture, Institute of Food and Agriculture Sciences, U. of Fla., Prentice-Hall.

Primary Examiner—Deborah L. Kyle
Assistant Examiner—Richard W. Wendtland
Attorney, Agent, or Firm—Julian C. Renfro

[57] ABSTRACT

A plant supporting arrangement or totem upon which the roots of growing plants can attach and receive nourishment and water in appropriate quantities is provided, which comprises at least one generally cylindrically shaped perforate frame, having at least one open end, and designed to be utilized in a substantially upright position. A suitable barrier is operatively associated with the perforate frame and this barrier serves to prevent soil placed inside the perforate frame from passing through in any quantity. The perforate frame has large enough apertures to permit the roots of one or more plants to reside in selected apertures, that the roots may thrive in the soil contained in the interior of the perforate frame. Several similar perforate frames containing soil can be stacked in an aligned, vertical array, and a suitable arrangement is provided for applying moisture and nutrition in controlled quantities at the upper end of the uppermost perforate frame, so as to encourage the plants growing on the frames to extend lateral root systems into the soil inside said frames. In the event vining plants are growing on the frames, and stems or runners extend across the boundaries between adjacent frames, such runners or stems can be cut at frame juncture locations so that upon separation of the frames, several plants can be established in individual containers.

27 Claims, 4 Drawing Sheets

VERTICAL PLANT SUPPORT HAVING TOP REEDER

BACKGROUND OF THE INVENTION

Commercial growers and nurserymen have long sought a truly satisfactory approach to the raising of vining plants, such as Epipremnum, otherwise known as Pothos. The devices or components upon which such plants are to be grown must provide moisture, fertilizer and air in proper quantities if such plants are to grow rapidly enough as to be marketable on an economical basis.

After much experimentation I have evolved a totem-pole-like device that furnishes an ideal medium upon which plants of many varieties may be grown to a large size in a very rapid, inexpensive, and highly satisfactory manner. My novel arrangement readily permits propagation by removal of the topmost section or sections of the device.

I am aware that many others have utilized devices of this general nature, and for example the Gauding U.S. Pat. No. 2,964,877 involves the use of an unglazed clay cylinder upon which the patentee grows a vining type plant. The upper portion of Gauding's clay cylinder forms a reservoir for water, with the unglazed clay permitting the permeation of moisture, such that the roots of the plant are provided sufficient water for plant growth needs. Gauding's plant support does not provide fertilizer to the roots of the plant, and it could not serve to grow plants on. In addition, the Gauding device would be quite heavy and much too expensive for commercial use.

The Ballai U.S. Pat. No. 3,188,771 involves the use of a plastic tube having numerous perforations and containing a compressed rod insert in its interior. I have found that plastic ends to repel plant roots, and in addition, a rod of fibrous material compressed enough to hold its shape would not hold enough water or fertilizer to promote proper plant growth. Furthermore, it is doubtful if the use of this device would provide enough air and ventilation to permit a proper root system to develop. If one should desire to propagate this plant by removing the top section, root formation would not be adequate to sustain plant growth and permit continued plant size increase.

The Choquette U.S. Pat. No. 3,334,440 teaches the use of a tube filled with a series of small perforations that is completed surrounded by a porous water absorbing and water evaporating element such as sphagnum moss. Sphagnum moss has been deemed by some to be a health hazard. Unfortunately, the Choquette arrangement involves a tedious filling of the tube with water, which is much too slow for commercial production, but in addition, the water or water solution is not evenly distributed, with the bottom of the tube being a much wetter environment than the top. Also, this arrangement does not lend itself to the growth of plants along the sides of the pole, nor does this arrangement permit the removal of the top section and the formation of a new plant, nor can the pole be lengthened.

The Goodricke U.S. Pat. No. 3,672,571 teaches the application of fertilizer through a watering system, but its drawbacks include constant exact pressure regulating pump pressure, and any buildup in the small feeder lines would result in the stoppage of flow to each plant. This patent of course fails to teach many of the attributes of the present invention, such as propagation by removal of the top section of the device.

The Jullien-Davin U.S. Pat. No. 3,738,060 utilizes a pumping system that would keep a moss covered pole moist and permit creeping type plants to adhere to the pole, but it would do nothing for feeding runners, and this arrangement would not permit the planting of non-vining plants along the pole. Furthermore, the cost would be prohibitive for a commercial operation, and it would not permit the top section to be removed in order that one or more new plants can be started.

The Horowitz U.S. Pat. No. 4,361,982 utilizes an umbrella-shaped topiary framework upon which plants can be grown, but this arrangement is not only costly, but also it does not allow sufficient air or nutrients to reach the root system. Furthermore, this arrangement does not permit the planting of non-vining plants with regular root systems along the length of the pole, nor can the top be removed for starting a new plant.

Because of the limitations of these other arrangements, I was motivated to evolve the present highly advantageous plant supporting arrangement.

SUMMARY OF THIS INVENTION

I have experimented with a number of different arrangements in the nature of what I call "totems" or "totem poles," by which terms I intend to connote tangible objects or emblems that can be stacked into a vertical arrangement to serve as a plant supporting means or medium. A text entitled "Foliage Plant Production," edited by Jasper N. Joiner, and published in 1981 by Prentice-Hall, Inc. has used such a term on Page 85, wherein the writer specifically refers to a totem pole for supporting a Philodendron.

The preferred plant supporting arrangement or totem I use is designed to provide an appropriate environment upon which the roots of growing plants, both of the vining and non-vining types, can attach and receive nourishment and water. The preferred arrangement comprises at least one generally cylindrically shaped perforate frame, having at least one open end, and designed to be utilized in a substantially upright position. A barrier means is operatively associated with the perforate frame and serves to prevent soil placed inside said perforate frame from passing through in any quantity. The elongate perforate frame I prefer to use has large enough apertures to permit the roots of one or more plants to reside in selected locations, that the roots may thrive in the soil residing in the interior of the perforate frame. The environment I provide by the use of my elongate perforate frames or totems greatly encourages additional roots to thereafter extend into such soil inside the frame. The stems of vining plants are encouraged by the highly desirable environment I provide, to put out numerous roots, which extend into the soil contained in the cylindrical frame. The means I preferably use for applying moisture and nutrition in controlled quantities to the roots of the plant or plants growing on the totem involves a top feeder arrangement.

The basic ingredient of my invention is therefore an elongate, generally cylindrical frame having coarse holes or apertures therein, with a porous barrier means preventing earth placed in the interior of the frame from being lost through the apertures of the generally cylindrical frame. For the sake of economy, the barrier means may for example take the form of plastic mesh or the like sold under the name of "shade screening."

Significantly, the generally cylindrical, elongate frames I use are stackable, so that a considerable number of plants can be grown on a single vertically arrayed unit.

An important feature of my plant growing arrangement is that it will permit a number of different types of plants to be grown thereon, with the roots of each plant receiving the proper amount of moisture, fertilizer and air as will permit many potentially large-leafed plants to grow rapidly. Another benefit is that the arrangement does not require too much of a grower's or nurseryman's time, for the use of the stackable frames readily enables a number of plants to be grown in closely grouped vertical arrays. By the use of the term "nurseryman" I intend to include growers of both sexes.

A typical vertical array in accordance with this arrangement readily lends itself to the use of a top feeder arrangement requiring a minimum amount of care and attention, with the one or more generally cylindrical, perforate frames constituting a given vertical array being readily separable at such time as sufficient root systems have been developed, and individual plants are ready to be sold on the wholesale or retail market.

A basic plant-supporting arrangement in accordance with this invention may thus be seen as enabling the roots of many types of plants to attach and receive nourishment and water, with this arrangement comprising at least one tall, generally cylindrically shaped perforate frame, or a number of perforate frames of shorter length. It is to be understood that upon the plants growing on tall frames establishing proper root systems, the tall frame may be cut into several smaller, generally cylindrical sections. If the somewhat shorter frames are used instead of the tall frames, such shorter frames can be pulled apart, after any stems extending across the juncture locations have been cut.

The perforate frames I use may be of metal mesh or of plastic, with coarse construction being utilized such that a large number of apertures are created therein. Potting soil is placed in the center of the frame, with the porous barrier or lining preventing the escape of any consequential amount of the earth.

As previously mentioned, the porous barrier may be of plastic, such as commercially available "shade screening," which can be readily cut away at the location of any aperture, such that the roots of selected plants can be inserted into the potting soil contained inside the porous barrier-lined perforate frame.

Quite advantageously, the soil contained in the interior of the frames I use forms an ideal location for the growth of the roots, for I prefer to add water containing a suitable fertilizer at the top of the frame, such that the water and nutrient can seep down in appropriate quantities to the roots of each of the various plants. This top feeder arrangement requires scant attention, for water and liquid nutrient can be delivered by gravity to a large number of plants with a minimum of effort, making this arrangement ideal for use by commercial growers as well as by individuals in their homes or gardens.

As should now be clear, my basic cylindrically shaped mesh frame lends itself for use in multiple arrangements, for one, two or three additional mesh frames can be stacked above the first member, so as to evolve a totem several feet in height, along the height of which a considerable number of plants can be grown, with such plants being either of a vining or a non-vining nature. In accordance my arrangement, water, nutrient and air in proper quantities are made available to the roots of each of the many plants, such that the various selected plants can develop very large and satisfactory root systems. As a result of this, after proper root systems have been developed, the various frame portions can be separated at the joinder locations, with the several frames stacked above the original frame then being used in individual locations for starting new, separate plants. This arrangement is quite a boon to the commercial grower, for he or she can start a considerable number of plants destined for sale to the wholesale or retail market in a short time, with a minimum of labor and material being involved.

It should now also be clear that I may use tall, generally cylindrical sections, which of course are to be cut apart into relatively short sections as soon as proper lateral root systems have been established.

It is therefore to be seen that a primary object of my invention is to provide a highly advantageous, compact arrangement for supporting and nourishing growing plants, such that plants of a vining or non-vining nature can be grown for market rapidly and with a minimum of effort and expense.

Another object of my invention is to create an elongate, generally cylindrically shaped frame containing soil, in which elongate frame any of a wide variety of plants can be grown, with all of the factors needed for proper growth and the establishment of proper root systems being made available without necessitating any degree of individual attention.

Still another object of my invention is to establish the utility and versatility of stackable, generally cylindrical plant growing frames in which numerous plants are to be started, the effective use of which frames enables floor space and attention by the grower to be minimized.

Yet still another object of my invention is to provide a plurality of generally cylindrically shaped, perforate frames having coarse holes therein and able to contain soil in its interior by the use of a porous barrier of plastic screening or the like, which frames can be stacked to a convenient height. Then suitable amounts of moisture and nutrition can be provided by gravity flow to the roots of many plants growing on the frames, with such frames able thereafter to be readily separated, upon the establishment of proper root systems. In this way, the grower or nurseryman can start what will become many individual plants at the same time.

These and other objects, features and advantages will be apparent from the drawings and further description of this invention.

DETAILED DESCRIPTION

Figure 1:
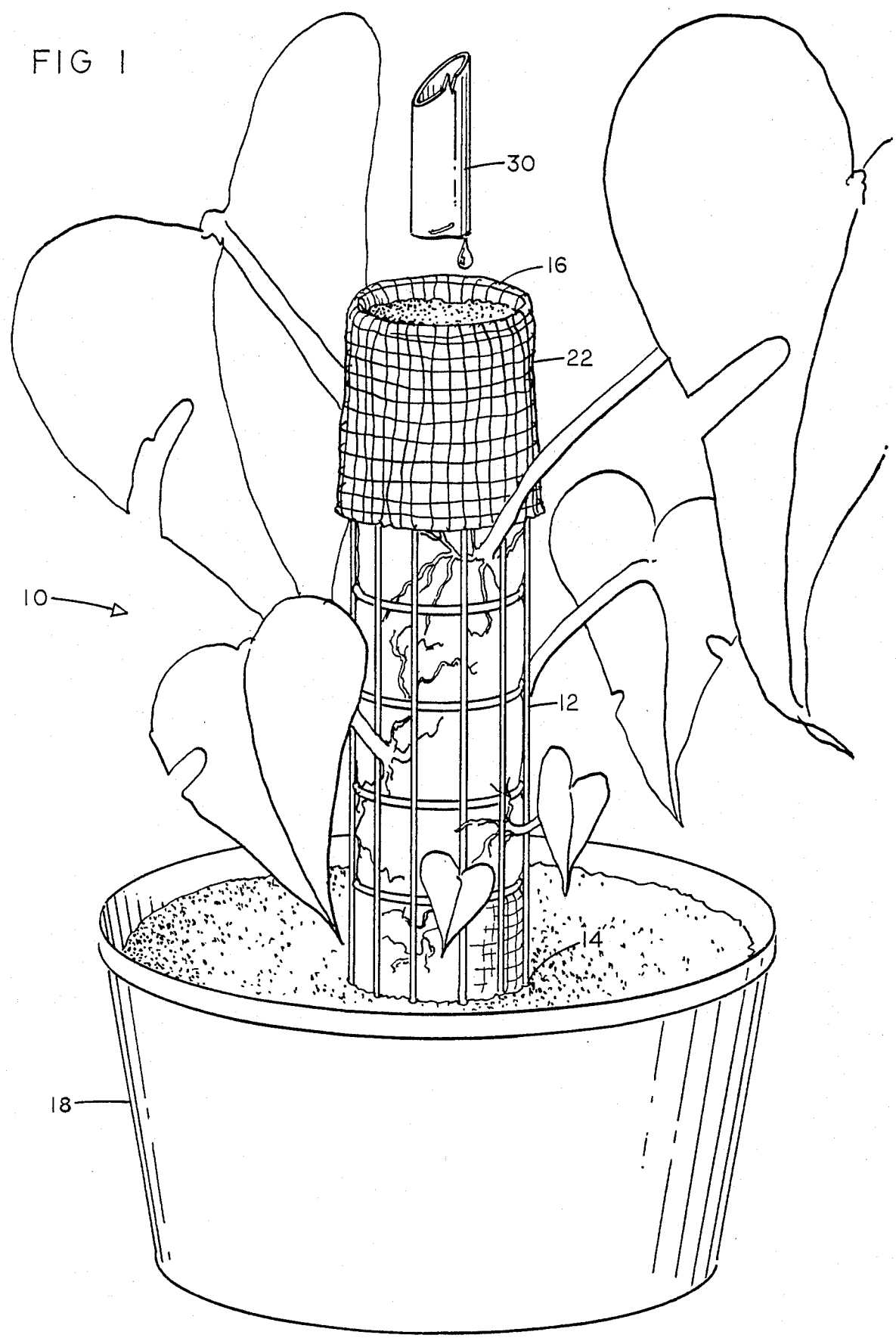
FIG. 1 is a view to a comparatively large scale of a typical cylindrically shaped, perforate frame in accordance with my invention, with it to be understood that a mesh or screen lining used inside the frame serves to keep soil placed in the interior of the frame from passing through the coarse openings of the frame.

In FIG. 1 it will be seen that I have depicted a typical arrangement 10 for supporting and nourishing plants and/or vines, comprising a generally cylindrically shaped perforate frame 12 having lower end 14 and upper end 16. The elongate frame 12 is intended to contain soil and may, for example, be formed from metal mesh having generally rectangular apertures therein, with such apertures being approximately 1 by 2 inches in size. When large apertures are used, I employ a porous barrier 22, such as of "shade screen," to prevent the loss of soil through such apertures.

I typically dispose the perforate frame destined to become the lowermost frame of a stack or group of frames, into a plastic or ceramic pot 18, with soil being piled around the lower end of the frame principally to retain the frame in an upright position. Normally the pot 18 serves no important role in furnishing the water and nutrition needed by the plants and/or vines grown on the perforate frame 12, for I prefer to use a top feeder arrangement 30 in most instances. As depicted in FIG. 1, water drips into the upper part of frame 12 from the top feeder 30, with time release fertilizer high in nitrogen and containing trace elements able to be contained in the device 30. Additional details of the preferred top feeder arrangement will be set forth hereinafter.

The diameter of the frame 12 may, for example, be in the range of 3 to 5 inches, with the height or length of a typical perforate frame of the stackable type may be on the order of 15 inches. Frames of this type are readily stackable, in accordance with this invention, in groups of three, four or five, so that a vining type plant started on the lowermost frame can grow upwardly and gradually extend roots into the soil contained in each of the frames of the stack or array; see FIG. 2. After the plant or plants have extended roots laterally into the soil contained in each of the upper frames of the array, the grower or nurseryman can then cut the stems or runners of the plant or plants in selected locations as will permit the various frames to be separated, such that each frame member or section can then be placed in a separate pot or container and thereafter grown separately. In such instances, the newly established plants can be fed by a top feeder, or by pouring water and placing fertilizer in the pot or bowl 18, as the purchaser may prefer. I have found that plants receiving water and fertilizer from a top feeder will, generally speaking, do better.

Quite obviously, I am not to be limited to any of the dimensions set forth above, and it is to be realized that the stackable frame members 12 that I use can be made of plastic instead of metal, or even constructed of another material. The apertures of the frame members may be in a wide range of sizes and configurations. Frames and shade screen colored green may be preferred by some growers and nurserymen.

Also, instead of creating several tiers of the comparatively short frame members, tall frame members may be utilized extending three feet, four feet, or even higher, with it being understood that the frame would be cut at several locations at such time as satisfactory lateral root systems have been established, so that a number of separate plants can be established in several different pots, bowls, dishes or the like, or even set out in the ground at selected locations.

The aforementioned apertures obviously can be of a configuration other than rectangular, and of a size quite different from that mentioned hereinabove. I prefer to use apertures large enough that the grower or nurseryman can insert his or her finger into the aperture, and through the porous barrier material, in order to make a small hole in the soil inside the frame, for the purpose of inserting the roots of a plant into the soil.

Inasmuch as I wish to retain soil in the generally cylindrical frame members in a manner to prevent the soil from passing through the apertures in the frame members, I could use, instead of the large aperture metal mesh, hardware cloth having square apertures $\frac{1}{2}$ inch, $\frac{3}{4}$ inch, or 1 inch on a side. The shade screening could in some of these instances be eliminated. The use of hardware cloth or its equivalent is more expensive an approach, however, so in order to improve the commercial feasibility of my novel frames, I prefer to use metal or plastic mesh having comparatively large apertures, and then use the previously mentioned porous barrier lining 22 along the interior of the generally cylindrical frame member 12. Thus, the barrier 22 itself forms what might be regarded as an open-ended cylinder that resides against the interior surface of the frame member 12. I usually prefer for the porous barrier to be of green plastic screening having a weave small enough to prevent earth or soil passing therethrough, except in minute quantities. The plastic screening commercially available as "shade screening" is easily penetrated by the nurseryman, grower or other user, meaning that finger-sized holes are easily created in the screening. The roots of the plant are then inserted through the aperture of the frame 12 and the newly formed hole in the screening, and into the soil contained inside the generally cylindrical frame member.

After a vining or non-vining plant has been planted and has commenced growing in an elongate frame member 12 in accordance with this invention, it can be expected that the plant will put out additional roots that will penetrate through the porous barrier associated with the generally cylindrical frame and grow and thrive in the soil located inside the frame. Inasmuch as these roots in effect grow sidewardly rather than generally downwardly, I prefer to call the roots "lateral roots," although it is true that the new roots grow a bit downwardly as well as upwardly as they grow inwardly into the interior of the frame members.

Figure 2:
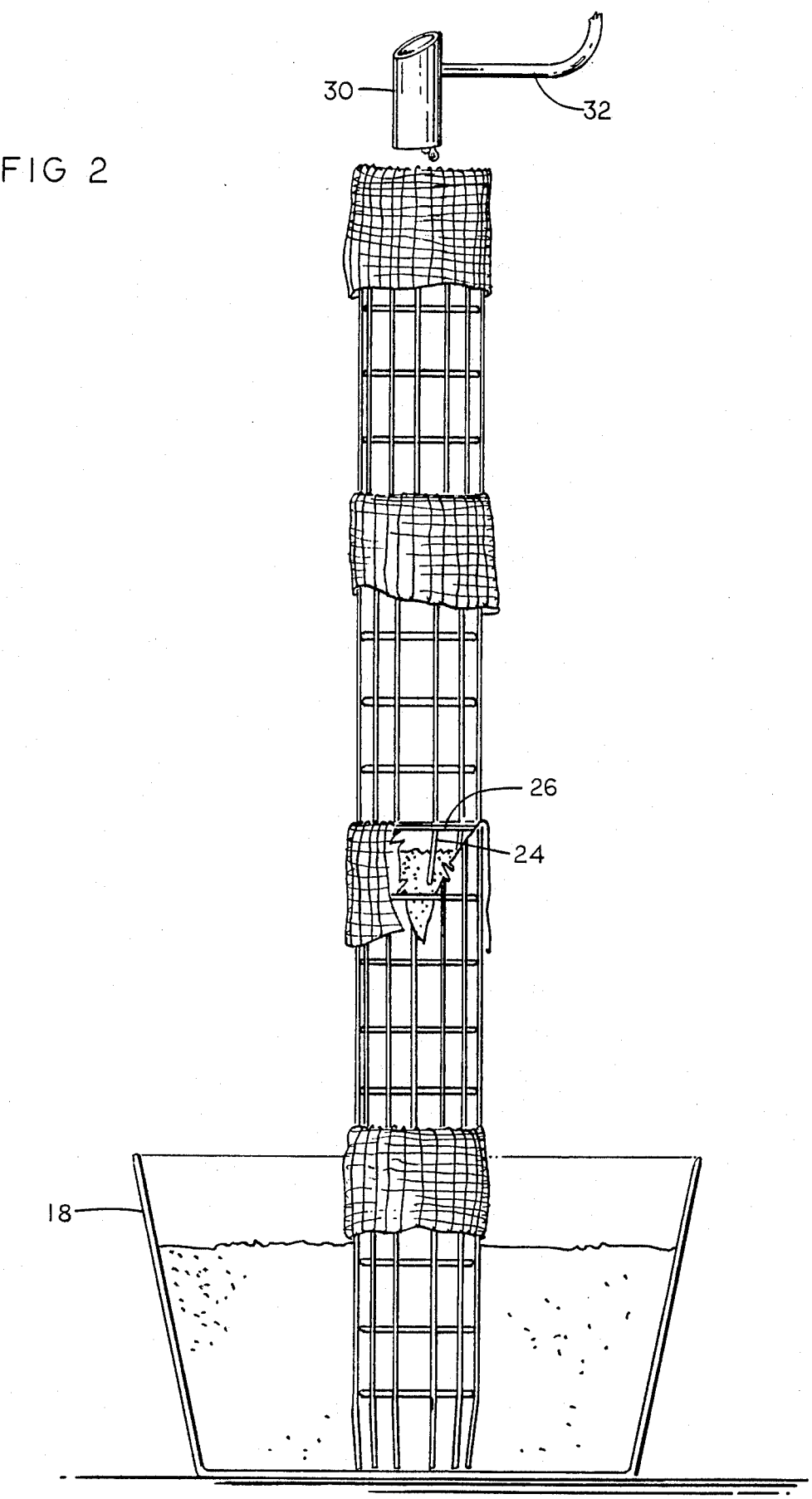
FIG. 2 is a view showing how a plurality of frames in accordance with this invention are utilized in a stacked arrangement such that a minimum of space and a minimum of attention are required, and wherein water and nutrition can be provided to the stacked frames by gravity means.

Unless I am setting out a number of nonvining plants at the same time, typically I do not stack up several of my novel frames into the configuration depicted in FIG. 2 at the time a new plant is being started. Rather, I add the second, third and further frames only as needed, or in other words, frames 12 are added to the stacked array only as a vining plant climbs higher and higher. With regard to FIG. 2, it will be noted that I have identified a prong 24 at the bottom of one of the stacked frames 12, with it to be understood that I prefer for a plurality of such prongs to exist at the bottom of each frame; note the lowermost frame 12 in FIG. 2. Preferably I cause an unbroken "ring" 26 to remain at the top of each frame, with any jutting prongs being eliminated from the top of each frame.

The creation of prongs at the bottom of each frame is brought about because in some instances I may wish to twist the prongs at the bottom of one frame, into a tight connection with the top ring or circle of the immediately lower frame of the stack. This is particularly true when I have created a stack of four, five or more frames, and I wish to assure the frames remaining in a substantially vertical array.

Although I am in no way limited to growing only certain plants on my generally cylindrically shaped perforate frame, I have found that some plants grow and thrive particularly well. One such example is Epipremnum, more commonly known as Pothos. This is a well-known vining plant that is typically grown in pots, such as hanging pots.

Most people knowledgeable as to Pothos expect the leaves to be three or four inches across, with leaves larger than this to be only rarely seen, such as at the top of tall trees, up which the plant has grown.

Figure 3:
FIG. 3 is a view showing how a plurality of stacked frames can be placed in a sloped or angled arrangement such that water and fertilizer added to the stacks can be caught and then recycled by a pump arrangement.

I have been able to grow Pothos on my novel cylindrical frames to an astonishingly large size, with some Pothos leaves being of a length of twenty inches, and a width of fourteen inches. Leaves of this size are simply not ever seen in pots. After a Pothos plant has sent stems or runners up the outside of one of my frames, it proceeds to extend roots into the soil contained within the frame. These roots, which as previously mentioned, I prefer to call lateral roots, are believed to be largely responsible for the Pothos leaves attaining such a large size. As shown in FIG. 3, the Pothos leaves tend to increase in size toward the upper end of the plant. Because of these lateral roots, the water and nutrition added at the top of the frame at appropriate intervals can be readily assimilated by the plant.

Figure 4:
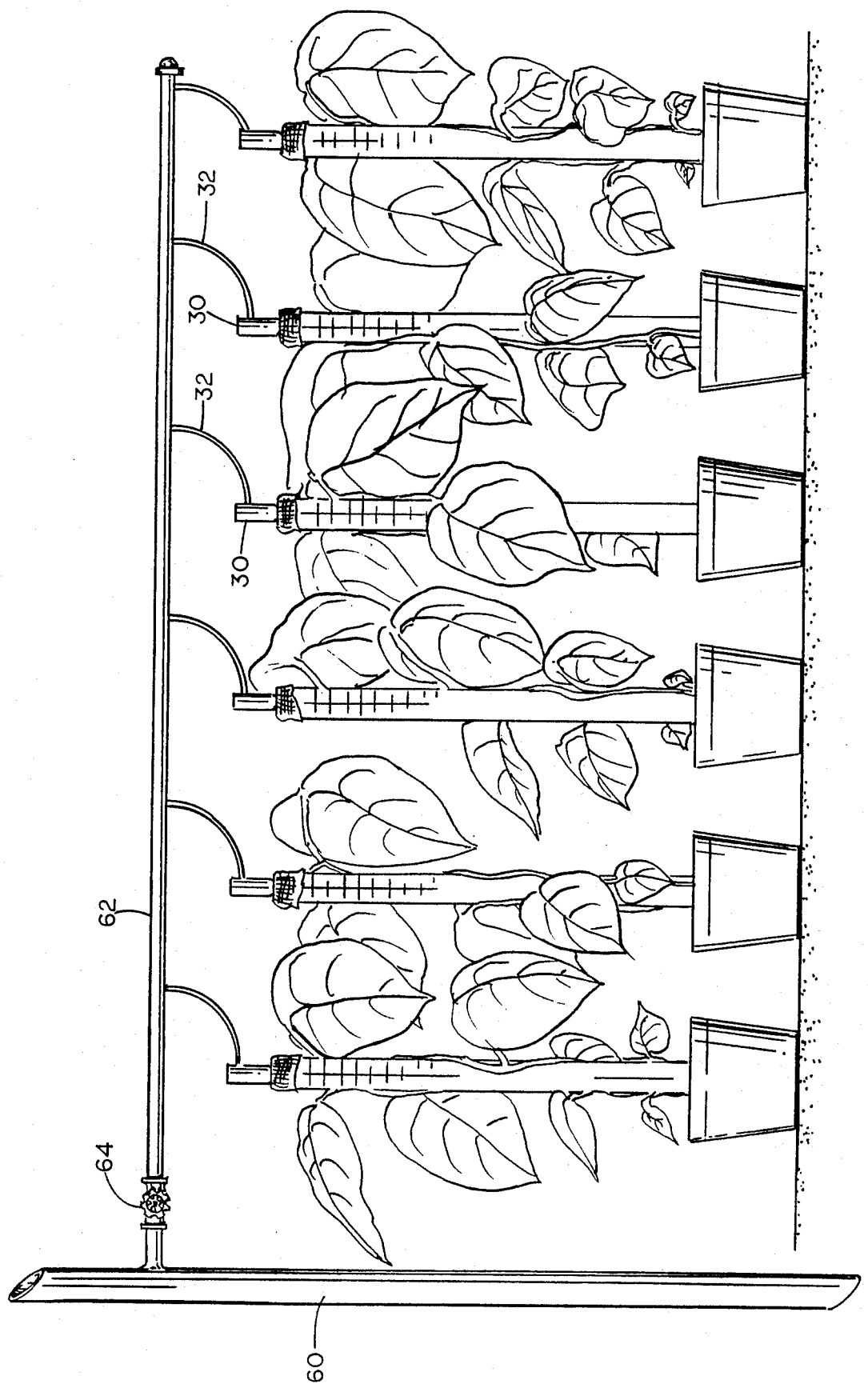
FIG. 4 is an arrangement in which a number of stacked arrays are placed on a generally level surface, such as on the floor of a greenhouse, with water and liquid fertilizer being supplied to the various stacks in measured quantities, so as to have minimal overflow.

The nutrition-bearing moisture supplied from a top feeder and flowing downwardly through the soil contained in my frames means that the lateral roots can receive ample food and moisture, without any danger of root rot. Two somewhat different top-feeding arrangements I have found to be quite satisfactory are shown in FIGS. 3 and 4, and it is to be noted that the top feeder arrangements also serve to flush undesirable salts and chemicals away from the soil in the vicinity of the lateral roots.

A significant ad vantage of the use of my elongate, generally cylindrically configured frames is that after lateral roots have been established, the runners or stems of vining plants growing on the exterior of the elongate frames can be cut at appropriate intervals and the frame components separated into individual, distinct sections. Each newly separated section is then preferably placed in a bowl or pot of its own, with soil packed around the bottom of the frame to serve as a support such that the frame can be expected to remain upright.

The lowermost section of the frame is typically permitted to remain in its original pot, bowl or other container, where it can readily serve as the basis for starting new sections of the plant. Typically, the "parent" plant frame, the lowermost plant of a given vertically disposed array, can be used only from one to three times in starting a stacked array, due to the fact that the vines or stems of an older Pothos plant, and other vining plants as well, tend to become quite large, and to occupy a considerable amount of the usable space of a frame 12.

With regard to the newly separated plant sections, the lateral roots each plant has developed can be relied on to provide water and nutrition to the new plants. Gradually, each new plant section will put down bottom roots into the soil contained in the pot or bowl, and eventually each newly separated section can serve as the means for starting new plants in additional cylindrical frames stacked in tiers above the newly separated section. The new frames are, of course, filled with soil and have water and nutrition applied, preferably by means of a top feeder arrangement.

Although I have specifically mentioned Pothos, I am not to be limited to this plant, for I have enjoyed considerable success growing many other vining and non-vining plants in accordance with my technique.

With particular regard now to FIG. 3 it will be seen that I have shown a spider plant 36, a pothos plant 38, and a heart leaf philodendron 40 supported in an angled trough 42 or the like. A nearby vessel 44 is used to contain a number of gallons of water to be circulated to these plants by means of a pump, such as a submersible pump 46, that is fed with electricity by means of an electric wire 48.

The pump 46 delivers water upwardly through vertically disposed pipe 50, with pipe 50 in turn being connected to a generally horizontal pipe 52. Although pipes of a suitable metal could be used, because of the ease with which plastic pipe can be worked, and because of its inexpensiveness, I prefer for the pipes 50 and 52 to be made of plastic, such as of PVC or the like. The diameter of the pipes 50 and 52 could, for example, be ¾ inch or 1 inch, as may be preferred. At times I prefer to use the comparatively soft, black plastic pipe available to growers.

It is relatively easy for the grower or nurseryman to create a small hole at appropriate locations in the horizontally disposed pipe 52, and at each such small hole, insert a short section of tubing 32 of the appropriate length and diameter such that water provided through pipe 52 by the efforts of the pump 46 can in turn be delivered in suitable quantities to the top frame of the stack of frames associated with each of the aforementioned plants residing on the sloped trough 42.

Although the short sections of tubing 32 could be utilized for delivering water directly to the open upper end of each stack of frames, I prefer to have a feeder device 30 at the end of each short piece of tubing 32, which feeder device can for example be made from a short piece of pipe the size of the pipes 50 and 52. The lower end of each such feeder device 30 is stapled together, but inasmuch as a single staple serving to close a device 30 does not render the location watertight, it is to be expected that water delivered by a tube 32 to each feeder device 30 will drip through onto the top frame of the respective stack. The feeder devices 30 made from these pieces of plastic pipe can contain a number of pellets of time release fertilizer, so as a result, each plant receives a suitable amount of nutrition as the water continues to be supplied through the pumping arrangement described above.

It is known that four or five different sizes of tubing, known as drip tubing, is available to growers and nurserymen, so the grower in each instance should select the tubing 32 to be of the appropriate diameter for his or her purposes.

I may for example wish to run the pump 46 for a one hour period every 12 hours, or in other words, the pump would typically run for a total of two hours each 24 hour period. Water supplied in such quantities to the plants will cause some degree of overflow from the pots containing the plants depicted in FIG. 3, which overflow is of course caught in the angled trough 42. A suitable filter 56 is utilized at the end of the trough, such that large particles contained in the water re-entering the vessel 44 for recirculation by the pump 46 will not be circulated, thus preventing any stoppage of the flow through the comparatively small tubes 32.

It is important to note that I am not to be limited to the use of a submersible pump in connection with the recirculating arrangement of FIG. 3, for other pump recirculation arrangements might be more suitable in certain circumstances.

Turning to FIG. 4, it will be seen that I have shown a multiplant arrangement much like shown in FIG. 3, involving a vertically disposed pipe 60, which connects to a generally horizontally disposed pipe 62 in which a shutoff valve 64 is located. In this instance, however, no recirculation of the water is utilized, and the several pots or other containers in which the plants of the stacked arrays are disposed reside on a substantially level surface, such as the floor of a nursery, or on the ground in a greenhouse. As before, a small drip tube 32 is utilized to provide water and nutrition to the upper frame of each frame 12 of the array. By having each of the drip tubes 32 lead to a top feeder device 30 containing pellets of the preferred type of fertilizer, each plant can be assured of receiving enough nutrition for its needs. As mentioned before, I prefer to utilize a pelletized fertilizer high in nitrogen, that contains trace elements.

In an arrangement of the type shown in FIG. 4, all of the plants are of the same variety, for as is well known, like plants have similar water and nutrition requirements, whereas if different plant varieties were mixed in the same grouping, some plants might obtain too much water and others too little water.

In this particular arrangement of a number of my novel stacked arrays, instead of using recirculation, I utilize an intermittent procedure for providing plant food and water to these plants. This may, for example, involve opening the shutoff valve 64 only at certain times, and when open, the valve 64 is usually adjusted for a small flow of water.

I have found that by opening the valve 64 for 15 minutes approximately three times per week, the several plants of the grouping thereby obtain a sufficient amount of water and fertilizer.

It is therefore to be seen that I have provided a highly advantageous, compact arrangement for supporting and nourishing growing plants, such that plants of a vining or non-vining nature can be grown for market rapidly and with a minimum of effort and expense. My novel, generally cylindrically shaped perforate frames are intended to contain soil, and on the exterior of which elongate frames, any of a wide variety of plants can be grown. Importantly, all of the factors needed for proper growth and the establishment of proper root systems are made available without necessitating any degree of individual attention by a grower or a homeowner.

Because my elongate frames are readily stackable, numerous plants are able to be started, and the effective use of my frames enables floor space and attention by the grower to be minimized. The stems of vining plants can be cut at juncture locations betrween frames, at which time the several frames can be separated and placed in individual pots, or set out in the ground for additional growth.

I claim:

1. A plant supporting arrangement upon which the roots of growing plants can attach and receive nourishment and water, said arrangement comprising at least one generally cylindrically shaped perforate frame designed to be utilized in a substantially upright position, barrier means of porous material operatively associated with said perforate frame and serving to prevent soil placed inside said perforate frame from passing through in any quantity, yet permitting the roots of the plants to breathe, said perforate frame having large enough apertures to permit the roots of one or more plants to reside in selected apertures, that the roots may thrive in the soil contained in the interior of said perforate frame, with the plants thereafter extending additional roots into such soil inside said frame.

2. The plant supporting arrangement as recited in claim 1 in which at least one end of said generally cylindrically shaped perforate frame is adapted to receive an end of a similarly shaped perforate frame placed generally in alignment therewith, so that additional plants can be grown at locations above the plants growing upon the first mentioned perforate frame.

3. The plant supporting arrangement as recited in claim 2 in which a top feeder arrangement is provided such that moisture and nutrition can be supplied by gravity means to a plurality of such plant supporting arrangements.

4. The plant supporting arrangement as recited in claim 3 in which said top feeder is operated intermittently.

5. The plant supporting arrangement as recited in claim 3 in which said top feeder utilizes a recirculating arrangement in which an electrically operated pump is used.

6. The plant supporting arrangement as recited in claim 1 in which two or more generally cylindrically shaped perforate frames are stackable into a vertical array, which frames may later be separated for the purpose of starting additional, separate plant growths after proper plant root systems have developed.

7. The plant supporting arrangement as recited in claim 1 in which said barrier means is represented by a frame member having small apertures.

8. The plant supporting arrangement as recited in claim 1 in which said barrier means is represented by plastic screen material disposed in a generally cylindrical configuration inside said perforate frame.

9. The plant supporting arrangement as recited in claim 1 in which said perforate frame stands at least three feet high.

10. A plant supporting arrangement upon which the roots of growing plants can attach and receive nourishment and water, said arrangement comprising at least one generally cylindrically shaped perforate frame, having at least one open end, and designed to be utilized in a substantially upright position, barrier means of porous material operatively associated with said perforate frame and serving to prevent soil placed inside said perforate frame from passing through in any quantity, yet permitting the roots of the plants to breathe, said perforate frame having large enough apertures to permit the roots of one or more plants to reside in selected apertures, that the root may thrive in the soil contained in the interior of said perforate frame, with the plants thereafter extending additional roots into such soil inside said frame, and means for applying moisture and nutrition in controlled quantities at the upper end of said perforate frame, for the benefit of the root systems of the plants.

11. The plant supporting arrangement as recited in claim 10 in which two or more generally cylindrically shaped perforate frames are stackable into a vertical array, which frames may later be separated for the purpose of starting additional, separate plant growths after proper plant root systems have developed.

12. The plant supporting arrangement as recited in claim 10 in which said means for applying moisture and nutrition involves a top feeder arrangement provided such that the moisture and nutrition can be supplied by gravity means to a sizable number of such plant supporting arrangements.

13. The plant supporting arrangement as recited in claim 12 in which said top feeder is operated intermittently.

14. The plant supporting arrangement as recited in claim 12 in which said top feeder utilizes a recirculating arrangement in which an electrically operated pump is used.

15. The plant supporting arrangement as recited in claim 10 in which said barrier means is represented by a frame member having small apertures.

16. The plant supporting arrangement as recited in claim 10 in which said barrier means is represented by plastic screen material disposed inside said perforate frame.

17. A plant supporting arrangment upon which the roots of vining plants can attache and receive nourishment and water, said arrangement comprising at least one generally cylindrically shaped perforate frame having open ends, and intended to be utilized in a generally upright position, a porous barrier disposed inside said perforate frame and residing against the interior of said frame, with said porous barrier enabling soil to be placed inside the porous barrier and not pass through said perforate frame in any quantity, said perforate frame having large enough apertures to permit the roots of one or more vining plants to reside in selected apertures and extend through the porous barrier, with the oxygen permitted to pass through the porous barrier enabling the roots to thrive in the soil contained in the interior of said frame, with such plants later extending runners or stems up the exterior of said frame, as well as lateral roots into the soil inside said frame, the upper end of said generally cylindrically shaped perforate frame being adapted to receive the lower end of a similarly shaped perforate frame placed above the first frame, so that stems or runners can grow upon the frame located above the first mentioned frame.

18. The plant supporting arrangement as recited in claim 17 in which three or more generally cylindrically shaped perforate frames are stackable into a vertical array, which frames may thereafter be separated for the purpose of starting additional plant growths after proper root systems have developed for the plants on all such frames.

19. The plant supporting arrangement as recited in claim 17 in which said perforate frame stands at least three feet high.

20. The plant supporting arrangement as recited in claim 17 in which a top feeder arrangement is provided such that water and nutrition can be supplied to a plurality of the plant supporting arrangements by gravity means.

21. The plant supporting arrangement as recited in claim 20 in which said plants are provided with a top feeder operated intermittently.

22. The plant supporting arrangement as recited in claim 20 in which said plants are provided with a top feeder involving a recirculating arrangement in which an electrically operated pump is used.

23. A totem arrangement upon which the roots of growing plants can attach and receive nourishment and water, said arrangement comprising at least one elongate perforate frame, having at least one open end, and designed to be utilized in a substantially upright position, barrier means of porous material operatively associated with said elongate frame and serving to prevent soil placed inside said elongate frame from passing through in any quantity, yet permitting the roots of the plants to breathe, said elongate frame having large enough apertures to permit the roots of one or more plants to reside in selected apertures, that the roots may breathe and thrive in the soil contained in the interior of said frame, and thereafter extend additional roots into such soil located inside said frame, and means for applying moisture and nutrition in controlled quantities at the upper end of said perforate frame, for the benefit of the root systems of the plants.

24. The totem arrangement as recited in claim 23 in which said plants are pro vide d with a top feeder operated intermittently.

25. The totem arrangement as recited in claim 23 in which said plants are provided with a top feeder involving a recirculating arrangement in which an electrically operated pump is used.

26. The totem arrangement as recited in claim 23 in which said barrier means is represented by a frame member having small apertures.

27. The totem arrangement as recited in claim 23 in which said barrier means is represented by plastic screen material disposed inside said perforate frame.

* * * * *